United States Patent [19]

Hicks et al.

[11] 4,292,292
[45] Sep. 29, 1981

[54] CHLORINE DIOXIDE GENERATION PROCESS

[75] Inventors: Bruce W. Hicks, Rio Linda; Jerry D. Hicks, Sacramento, both of Calif.

[73] Assignee: Rio Linda Chemical Company, Rio Linda, Calif.

[21] Appl. No.: 154,831

[22] Filed: May 30, 1980

[51] Int. Cl.$^3$ .............................................. C01B 11/02
[52] U.S. Cl. ..................................................... 423/477
[58] Field of Search ......................................... 423/477

[56] References Cited

U.S. PATENT DOCUMENTS 3,386,915  6/1968  Rutschi ................ 423/477
4,013,761  3/1977  Ward ................... 423/477

FOREIGN PATENT DOCUMENTS 210932  7/1960  Austria ................ 423/477

Primary Examiner—Brian E. Hearn

[57] ABSTRACT

The present invention is directed to a chlorine dioxide generation process. The Novel process of this invention utilizes concentrated hydrochloric acid solution reacted with concentrated sodium chlorite solution, without prior dilution of either reactant. Resulting in consistent high efficiency with respect to yield and chemical consumption.

5 Claims, No Drawings

CHLORINE DIOXIDE GENERATION PROCESS

FIELD OF THE INVENTION

This invention relates to a chlorine dioxide generation process and is more particularly concerned with a procedure which utilizes a chlorite and hydrochloric acid.

BACKGROUND

Chlorine dioxide is utilized in a variety of processes including a large number of bactericidal applications, especially in the fields of water treatment and odor abatement. Its usage is continuing to grow for many reasons. Due to the unstable nature of gaseous chlorine dioxide when compressed it is necessary to produce chlorine dioxide on site rather than to produce it at a plant and ship it for useage when needed. The prior art processes involve the production of chlorine dioxide by the reaction of a chlorite with a diluted hydrochloric acid, followed by introduction into the water system to be treated.

Procedures for the manufacture of chlorine dioxide which have been previously proposed, especially those utilizing the chlorite/hydrochloric acid process, require the use of elaborate generation equipment that includes means of diluting the hydrochloric acid or they involve the use of plant personnel to dilute the hydrochloric acid which is a hazardous undertaking. Often these procedures require the use of an additional catalyst such as Potasium Persulfate or Potasium Perborate adding to the expense, and also can contaminate the chlorine dioxide with unwanted by-products. Also they require the use of excessive amounts of hydrochloric acid from 200 to 325% in excess of the stoichiometric weight requirements; this also adds another unnecessary expense. Others also require the careful control of the reaction temperature, which makes the reaction difficult to control, and complicates the equipment necessary.

We have found that all of these problems can be overcome, and that a superior method of generating chlorine dioxide in a safe manner may be achieved by utilization of the process of the present invention.

It is therefore a principal object of this invention to provide a process for the preparation of chlorine dioxide which is relatively simple, is safe, uses commercially available chemicals in their concentrated form, requiring no pre-dilution, and achieves consistently high yields.

Still another object of the present invention is to provide a process that requires only a chlorite and hydrochloric acid, and is not dependent on an expensive catalyst.

Another object of the present invention is to provide a process for the production of chlorine dioxide which is very economical by requiring substantially less hydrochloric acid to obtain high yields.

Still another object is to provide a process which is not dependent on elevation or control of temperature.

Other objects will become apparent hereinafter.

SUMMARY OF THE INVENTION

In accordance with this invention there is provided a process for the preparation of chlorine dioxide that obtains consistently high yields by reacting a concentrated sodium chlorite solution with a concentrated hydrochloric acid solution in the absence of dilution water, producing four moles of chlorine dioxide for every five moles of sodium chlorite according to the following non-limiting equation:

$$5NaClO_2 + 4HCL \rightarrow ClO_2 + 5NaCl + 2H_2O$$

Thus 0.8 moles hydrochloric acid is needed per one mole of sodium chlorite for a stoichiometric reaction.

DETAILED DESCRIPTION OF THE INVENTION

The process of the present invention calls for concentrated from 6 molar to 12 molar, preferably 10 molar, hydrochloric acid to be reacted undiluted with a concentrated from 0.7 molar to 3.49 molar, preferably 1.92 molar, solution of sodium chlorite. The 10 molar acid and the 1.92 molar chlorite are fed neat into a reactor on a continuous basis at regulated proportions. A ratio of 1 mole sodium chlorite to 0.92 mole hydrochloric acid is used. This is a 15% excess over the stoichiometric requirement. A reaction time of 20–30 minutes is adequate to proceed to completion. It is the use of 10 molar hydrochloric acid reacted undiluted that results in a 100% conversion to chlorine dioxide, using only a 15% excess over the stoichiometric mole ratio. Current art uses from 2.48 to 3.4 moles of hydrochloric acid per 1 mole of sodium chlorite which is a 200 to 325% excess over the stoichiometric to obtain 85 to 100% yields.

In one process by E. E. Bandi Lebensmit Hyg. 58:170 1967 a 0.91 molar solution of sodium chlorite and a 2.57 molar hydrochloric acid are reacted using a ratio of 2.48 moles hydrochloric acid per one mole of sodium chlorite. With careful control of temperature and proper mixing yields of 90 to 100% are claimed.

In another prior art process described by W. J. Masschelein in his book "Chlorine Dioxide", published by Ann Arbor Science 1979, a 3.3 molar solution of sodium chlorite and a 1.6 molar solution of hydrochloric acid are reacted using a ratio of 2.9 to 3.4 moles hydrochloric acid per one mole of sodium chlorite, a 95 to 100% yield results.

In still another process Swiss Patent #481,839 and 498,045 a 1.28 molar solution of sodium chlorite and a 3.4 molar solution of hydrochloric acid are reacted using a mole ratio of 2.8 to 3.2 moles hydrochloric acid per one mole of sodium chlorite. This process also uses a catalyst and yields of 85 to 95% are obtained.

The current state of the art teaches that concentrated hydrochloric acid and concentrated sodium chlorite cannot be reacted without prior dilution of the acid. However, we have found that the reaction is very safe and no explosion will result, and, that the acid required to reach a 90% yield or better is about one third the amount required to achieve these yields if acid pre-dilution is practiced.

In a second embodiment of the present invention, it was found that the yield or conversion to chlorine dioxide will approach 100% if the hydrochloric acid is used at the stoichiometric ratio. More specifically, when the 10 molar hydrochloric acid was fed at a ratio of 1 mole of sodium chlorite to 0.8 moles of hydrochloric acid, a 95% yield was obtained.

In another embodiment of the present invention it was found that a shorter reaction time would result from using a higher ratio of acid. By increasing the acid feed rate from 118% to 150% excess above the stoichiometric ratio the reaction time will decrease from 20–30 minutes to 8–12 minutes and the yield remains at 100%.

The following examples are given to illustrate the process of the present invention but are not to be construed as limiting the invention thereto.

EXAMPLES

Example I

A 1.92 molar solution of sodium chlorite was fed into the bottom of a packed reaction column at the rate of 112.2 ccm or 19.5 gms per minute. Hydrochloric acid 10 molar was fed neat also into the bottom of the reaction column, at a rate of 20.5 ccm or 7.3 gms/minute, this feed rate corresponding to 15% excess hydrochloric acid above the stoichiometric ratio of 1 mole sodium chlorite per 0.8 mole hydrochloric acid. The actual ratio would be 1 mole sodium chlorite to 0.92 mole hydrochloric acid. The generator was run for 60 minutes to insure a continuous, operational, equalibrium. Chlorine dioxide was taken out of the top of the generator over flow after being diluted with tap water. Test were made on a spectophotometer at 360 NM and showed a 100% conversion of the stoichiometric chlorine dioxide.

Example II

A 1.92 molar solution of sodium chlorite was fed into the bottom of a packed reaction column at the rate of 110.4 ccm (19.2 gms/min.). Hydrochloric acid 10 molar was also fed into the bottom of the above mentioned column at the rate of 17.6 ccm, (6.27 gms/min.), this ratio corresponding to the stoichiometric ratio of 1 mole of sodium chlorite to 0.8 mole hydrochloric acid.

The generator was allowed to run for 60 minutes for a continuous, stable, operation. The chlorine dioxide was diluted with tap water and run on a Turner Spectophotometer at 360 nanometers. The results showed a 95% conversion to chlorine dioxide of the stoichiometric 4 moles chlorine dioxide to 5 moles sodium chlorite.

Example III

A 1.92 molar solution of sodium chlorite was fed into the bottom of a packed reaction column at the rate of 315 ccm or 54.8 gms/min. hydrochloric acid 10 molar was fed neat into the opposite side of the reaction column at the rate of 107.2 ccm or 38.2 gms/min. This feed rate corresponding to a 118% excess of hydrochloric acid above the stoichiometric ratio of 1 mole sodium chlorite to 0.8 mole hydrochloric acid. The actual mole ratio would be 1 mole sodium chlorite to 1.75 moles hydrochloric acid. The generator was run for 30 minutes to insure a stable continuous operation. The chlorine dioxide exiting out the top of generator was diluted with tap water and measured on a Turner Spectophotometer at 360 NM. The results showed a 100% conversion to chlorine dioxide.

PROCESS TECHNOLOGY

As has been indicated, the general reaction of sodium chlorite and hydrochloric acid is known to the art. The advance of this invention is seen to be the reaction of concentrated 10 molar hydrochloric acid solution with concentrated sodium chlorite solution removed from the dilution or possibly quenching effect of water. By using this process a dramatic decrease in the hydrochloric acid requirement results. Temperature control and/or the need of a catalyst are eliminated, the yield of chlorine dioxide is very high, and the elimination of a costly acid dilution procedure is accomplished.

Since certain changes may be made in the above process without departing from the scope of the invention herein involved, it is intended therefore that all matter contained in the above description shall be interpreted as illustrative and not in a limiting sense.

We claim:

1. A continuous process for producing chlorine dioxide by the reaction of a chlorite in a strong hydrochloric acid solution which comprises: Maintaining a constant level in a single reactor, in the absence of dilution water, by continuously feeding an undiluted solution of sodium chlorite that is from 0.7 molar to 3.49 molar into the reactor, and continuously feeding an undiluted hydrochloric acid solution that is from 6 molar to 12 molar into the reactor wherein from 0.8 moles to 2 moles of hydrochloric acid is supplied per mole of sodium chlorite, continuously removing the excess solution containing the generated chlorine dioxide from the reactor.

2. Process of claim 1 wherein the sodium chlorite is from 1.5 molar to 2.5 molar.

3. Process of claim 1 wherein the hydrochloric acid is from 9.5 molar to 10.5 molar.

4. Process of claim 1 wherein from 0.93 moles to 1.75 moles of hydrochloric acid is supplied per mole of sodium chlorite.

5. A process for producing chlorine dioxide by the reaction of a chlorite in a strong hydrochloric acid solution which comprises:

reacting in the absence of dilution water an undiluted solution of sodium chlorite that is from 0.7 molar to 3.49 molar with an undiluted hydrochloric acid solution that is from 6 molar to 12 molar in a reactor wherein from 0.8 moles to 2 moles of hydrochloric acid is supplied per mole of sodium chlorite.

* * * * *